United States Patent
Budde

(10) Patent No.: US 9,973,034 B2
(45) Date of Patent: May 15, 2018

(54) SYSTEMS AND METHODS FOR LOAD HARMONIC SUPPRESSION

(71) Applicant: SCHNEIDER ELECTRIC IT CORPORATION, West Kingston, RI (US)

(72) Inventor: Kristian Budde, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 146 days.

(21) Appl. No.: 15/107,356

(22) PCT Filed: Dec. 23, 2013

(86) PCT No.: PCT/US2013/077468
§ 371 (c)(1),
(2) Date: Jun. 22, 2016

(87) PCT Pub. No.: WO2015/099656
PCT Pub. Date: Jul. 2, 2015

(65) Prior Publication Data
US 2016/0372971 A1    Dec. 22, 2016

(51) Int. Cl.
*H02J 9/06*    (2006.01)
*H02J 7/00*    (2006.01)
(Continued)

(52) U.S. Cl.
CPC .......... *H02J 9/062* (2013.01); *H02J 7/0052* (2013.01); *H02M 1/12* (2013.01); *H02M 7/04* (2013.01); *H02M 7/44* (2013.01)

(58) Field of Classification Search
CPC .......... H02J 7/0052; H02M 1/12; H02M 7/04; H02M 7/44
See application file for complete search history.

(56) References Cited

U.S. PATENT DOCUMENTS 5,327,335 A * 7/1994 Maddali ................. H02M 1/12
                                                             363/132
5,343,379 A    8/1994   Kirchberg et al.
(Continued)

FOREIGN PATENT DOCUMENTS

| CN | 101771356 A | 7/2010 |
| CN | 102780263 A | 11/2012 |
| WO | 8502070 A1 | 5/1985 |

OTHER PUBLICATIONS

Notification of Transmittal of the International Search Report and the Written Opinion of the International Searching Authority from corresponding PCT/US2013/077468 dated Apr. 30, 2014.
(Continued)

*Primary Examiner* — Robert Deberadinis
(74) *Attorney, Agent, or Firm* — Lando & Anastasi, LLP

(57) ABSTRACT

An uninterruptable power supply (UPS) is provided. The UPS includes a first input constructed to receive input power from a first power source, a second input constructed to receive input power from a second power source, an output constructed to provide output alternating current (AC) power derived from at least one of the first power source and the second power source, an inverter coupled to the first input, the second input, and the output and constructed to generate the output AC power, and a controller coupled to the inverter. The controller is configured to identify one or more harmonics in the output AC power, generate an inverter reference signal, and modulate the inverter reference signal to reduce harmonic distortion contributed by the one or more harmonics.

20 Claims, 6 Drawing Sheets

(51) Int. Cl.
H02M 1/12 (2006.01)
H02M 7/04 (2006.01)
H02M 7/44 (2006.01)

(56) References Cited

U.S. PATENT DOCUMENTS 6,134,127 A * 10/2000 Kirchberg ............... H02M 1/12
                                                    363/41
6,295,216 B1    9/2001  Faria et al.
2003/0048006 A1  3/2003  Shelter et al.
2005/0275976 A1 12/2005 Taimela et al.
2008/0278005 A1 11/2008 Chambon
2012/0181871 A1  7/2012  Johansen et al.

OTHER PUBLICATIONS

Extended European Search Report from corresponding European Application No. 13900239.8 dated Jul. 20, 2017.

* cited by examiner

SYSTEMS AND METHODS FOR LOAD HARMONIC SUPPRESSION

CROSS-REFERENCE TO RELATED APPLICATIONS

This application is a U.S. National Stage Application under 35 U.S.C. § 371 of International Application No. PCT/US2013/077468, filed Dec. 23, 2013, titled SYSTEMS AND METHODS FOR LOAD HARMONIC SUPPRESSION, which is hereby incorporated herein by reference in its entirety.

BACKGROUND

Technical Field

Embodiments of the present disclosure relate generally to load harmonic suppression. More specifically, embodiments relate to systems and methods for load harmonic suppression in uninterruptable power supplies (UPS).

Background Discussion

UPSs are generally constructed to isolate a load from disturbances in an external power source (e.g., a power grid). Various parameters may be measured to analyze the quality of the power output by the UPS to the load. For example, the total harmonic distortion (THD) of the output voltage waveform by the UPS may be determined. The THD parameter of a waveform compares the magnitude of the harmonics with the magnitude of the fundamental frequency present in the waveform. The harmonics are signals present in the waveform at integer multiple frequencies of the fundamental frequency. A large THD value indicates that the waveform is distorted while a low THD value indicates that the waveform is undistorted.

The voltage waveform output by a UPS may become distorted due to the characteristics of the load being supplied. In particular, switch-mode power supply (SMPS) loads draw current with a substantial amount of harmonics. SMPSs variably draw current while performing voltage regulation and subsequently distort the voltage waveform.

SUMMARY

According to one aspect, an uninterruptable power supply (UPS) is provided. The UPS comprises a first input constructed to receive input power from a first power source, a second input constructed to receive input power from a second power source, an output constructed to provide output alternating current (AC) power derived from at least one of the first power source and the second power source, an inverter coupled to the first input, the second input, and the output and constructed to generate the output AC power, and a controller coupled to the inverter. The controller is configured to identify one or more harmonics in the output AC power, generate an inverter reference signal, and modulate the inverter reference signal to reduce harmonic distortion contributed by the one or more harmonics.

In one embodiment, the controller is configured to identify at least one of a third harmonic, a fifth harmonic, a seventh harmonic, a ninth harmonic, and an eleventh harmonic. In one embodiment, the controller is further configured to identify the one or more harmonics in the output AC power at least in part by performing a Fourier transform on the output AC power.

In one embodiment, the controller is further configured to generate the inverter reference signal by generating a sinusoidal reference signal. The controller may be further configured to modulate the inverter reference signal at least in part by combining the sinusoidal reference signal with a harmonic compensation signal generated based on the identified one or to more harmonics.

In one embodiment, the controller is further configured to measure total harmonic distortion (THD) of a voltage associated with the output AC power. In one embodiment, the controller is further configured to select a harmonic of the one or more harmonics. In one embodiment, the controller is further configured to modulate the reference signal at least in part by finding a local THD minima with respect to the selected harmonic. In one embodiment, the controller is further configured to find the local THD minima with respect to the selected harmonic at least in part by reducing power of the selected harmonic in the output AC power and measuring the THD of the voltage waveform of the output AC power. In one embodiment, the controller is further configured to find the local THD minima with respect to the selected harmonic at least in part by increasing power of the selected harmonic in the output AC power and measuring the THD of the voltage waveform of the output AC power.

In one embodiment, the controller is further configured to identify the one or more harmonics at least in part by comparing an output current waveform of the AC output power to a sinusoidal reference signal and performing a look-up in a table of UPS loads and corresponding harmonic contributions. The controller may be further configured to modulate the reference signal at least in part by generating a harmonic compensation signal based on identified harmonics in the table of UPS loads and corresponding harmonic contributions.

According to one aspect, a method for suppressing at least one harmonic of one or more harmonics in an output waveform of an uninterruptable power supply (UPS) is provided. The method comprises receiving input power from a power source, generating output alternating current (AC) power derived from the input power based on an inverter reference signal, identifying one or more harmonics in the output AC power, generating the inverter reference signal, and modulating the inverter reference signal to reduce harmonic distortion contributed by the one or more harmonics.

In one embodiment, identifying the one or more harmonics includes identifying at least one of a third harmonic, a fifth harmonic, a seventh harmonic, a ninth harmonic, and an eleventh harmonic. In one embodiment, generating the inverter reference signal includes generating a sinusoidal reference signal and wherein modulating the inverter reference signal includes combining the sinusoidal reference signal with a harmonic compensation signal generated based on the identified one or more harmonics. In one embodiment, modulating the inverter reference signal includes finding a local THD minima with respect to a selected to harmonic of the one or more harmonics.

According to one aspect, a non-transitory computer readable medium storing sequences of instructions executable by at least one processor, the sequences of instructions instructing the at least one processor to execute a process for harmonic suppression in an uninterruptable power source (UPS), the UPS including an inverter, is provided. The sequences of instructions include instructions configured to receive input power from a power source, generate output alternating current (AC) power derived from the input power based on an inverter reference signal, identify one or more harmonics in the output AC power, generate the inverter reference signal, and modulate the inverter reference signal to reduce the harmonic distortion contributed by the one or more harmonics.

In one embodiment, the instructions to identify the one or more harmonics include instructions to identify at least one of a third harmonic, a fifth harmonic, a seventh harmonic, a ninth harmonic, and an eleventh harmonic. In one embodiment, the instructions to generate the inverter reference signal include instructions to generate a sinusoidal reference signal and wherein the instructions to modulate the inverter reference signal include instructions to combine the sinusoidal reference signal with a harmonic compensation signal generated based on the identified one or more harmonics. In one embodiment, the instructions to modulate the inverter reference signal include instructions to find a local THD minima with respect to a selected harmonic of the one or more harmonics.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and to documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be to excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As described above, the output waveform of a UPS generally includes harmonic distortion caused by, for example, switch-mode power supply (SMPS) loads on the UPS. Accordingly, aspects of the current disclosure relate to UPSs with harmonic suppression capabilities to reduce the THD of the output voltage waveform. In one embodiment, the UPS outputs alternating current (AC) power to a load via an inverter circuit coupled between a direct current (DC) bus of the UPS and the load. In this embodiment, the harmonic distortion in the output voltage waveform is suppressed by modulating and inverter reference signal used by the inverter to generate the output voltage waveform. The UPS modulates the inverter reference signal by combining a harmonic compensation signal based on identified harmonics in the output voltage waveform and a sinusoidal reference. The resulting combination of the harmonic compensation signal and the sinusoidal reference forms the inverter reference signal thereby reducing the THD of the output voltage waveform.

Example UPS

Figure 1:
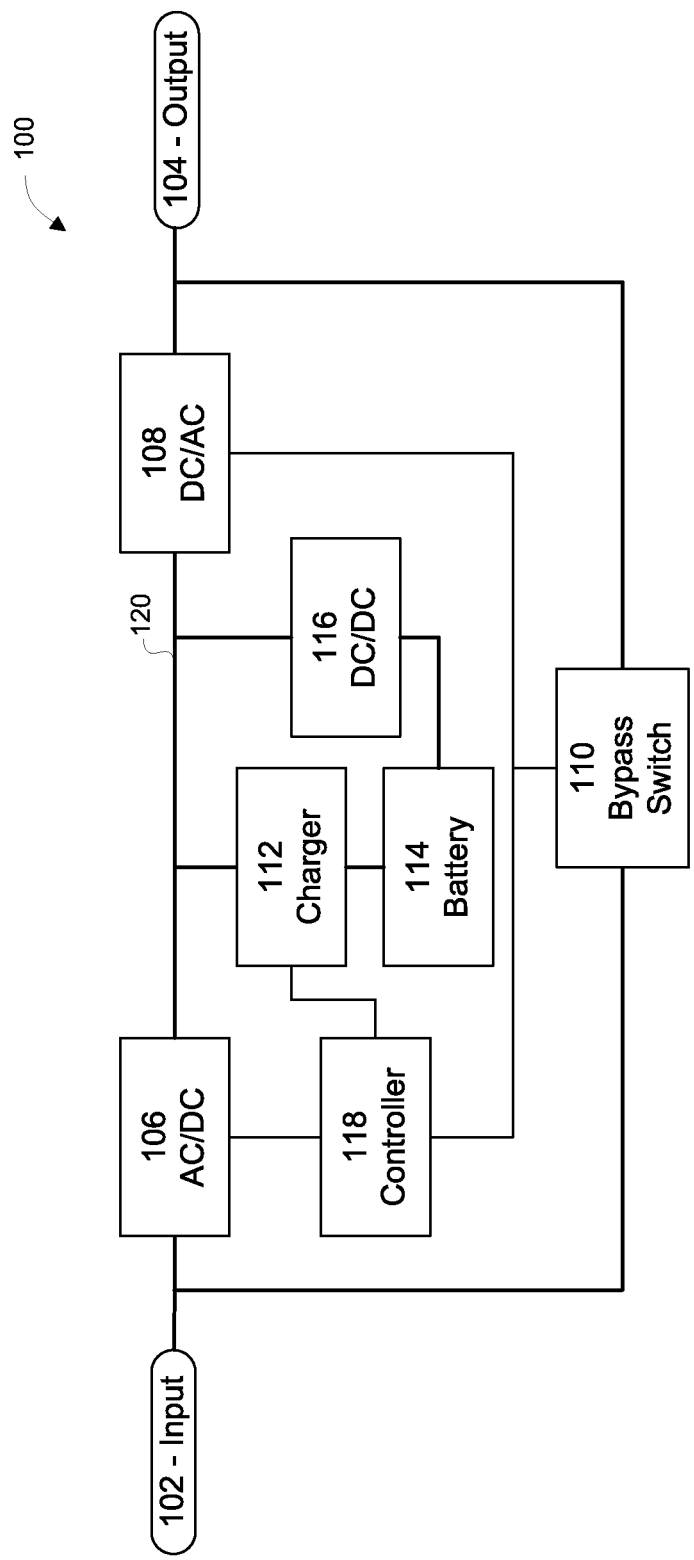
FIG. 1 illustrates one embodiment of a UPS block diagram.

FIG. 1 illustrates an example UPS 100 constructed to receive power from an external source and provide output power to a load. The UPS 100 includes an input 102, an output 104, a bypass switch 110, an AC/DC rectifier 106, a DC bus 120, a DC/AC inverter 108, a battery charger 112, a battery 114, a DC/DC converter 116, and a controller 118.

The input 102 is constructed to receive power from an external AC power source such to as a utility power source. The input 102 is coupled to the AC/DC rectifier 106 that converts the input AC power to DC power. The input 102 is also selectively coupled to the output 104 via the bypass switch 110. The output 104 is constructed to output AC power to a load. The UPS may be constructed to receive via input 102 and output via output 104 single-phase AC power or three-phase AC power.

The AC/DC rectifier 106 is also coupled to the DC/AC inverter 108 via the DC bus 120. The battery 114 is coupled to the DC bus 120 via the battery charger 112 and also to the DC bus 120 via the DC/DC converter 116. The controller 118 is coupled to the AC/DC rectifier 106, the DC/AC inverter 108, the bypass switch 110, the battery charger 112, and the DC/DC converter 116. In other embodiments, the battery 114 and the charger 112 may be coupled to the AC/DC rectifier 106.

In one embodiment, the UPS 100 is configured to operate in one or more modes of operation based on the quality of the AC power received from the utility source. In this embodiment, the controller 118 monitors the AC power received from the utility source at the input 102 and, based on the monitored AC power, sends control signals to the bypass switch 110, the battery charger 112, the AC/DC rectifier 106, the DC/AC inverter 108, and the DC/DC converter 116 to control operation of the UPS 100. The UPS modes of operation may include, for example, a bypass mode, an online mode, and a battery mode. In online mode, the bypass switch 110 is off and the input power received at the input 102 is rectified in the AC/DC rectifier 106 and inverted in DC/AC inverter 108 before reaching the output 104. A portion of the power received at the input port may be used to charge the battery 114 via the charger 112. In bypass mode, the UPS 100 directly couples the input 102 to the output 104 via the bypass switch 110. In battery mode, the UPS 100 draws power from the battery 114 via the DC/DC converter 116 to supplement and/or replace the power received at the input 102.

Figure 2:
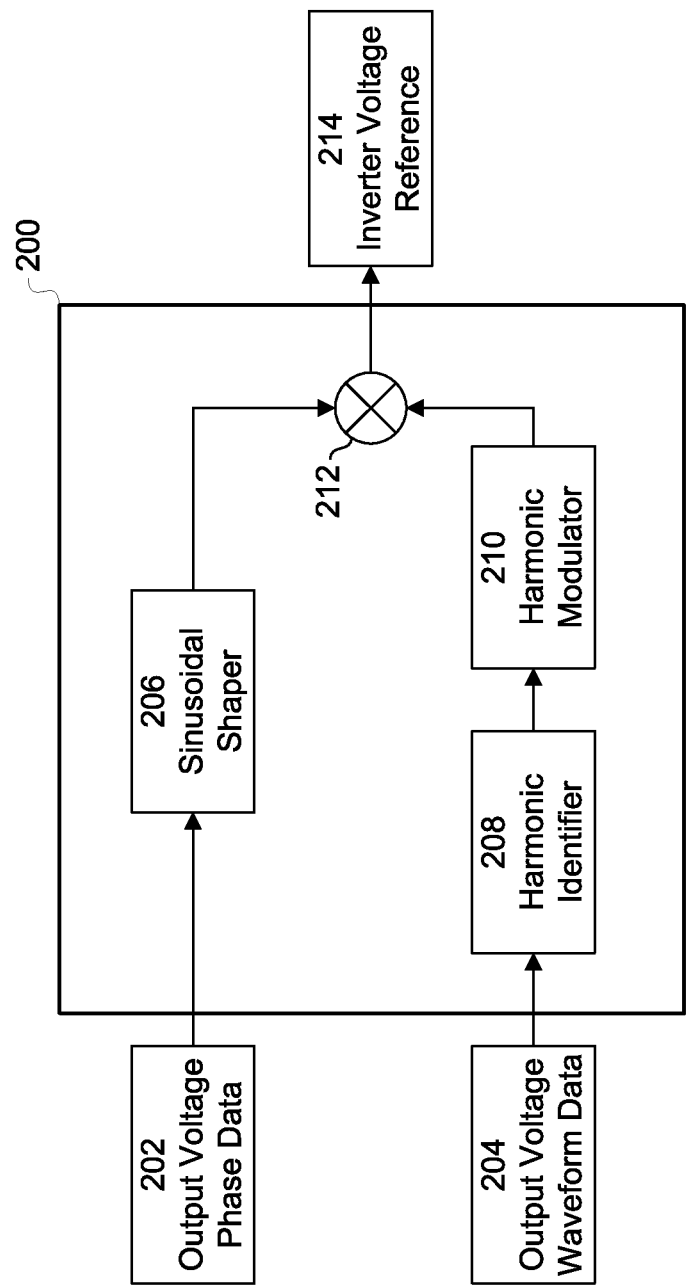
FIG. 2 illustrates one embodiment of a UPS controller block diagram.

In at least one embodiment, the controller 118 is configured to reduce the THD of the output voltage waveform of the UPS 100. FIG. 2 illustrates an example controller 200 for a UPS (e.g., controller 118 for UPS 100) configured to reduce the THD of the output voltage waveform. The controller 200 receives output voltage phase data 202 and output voltage waveform data 204. The received output voltage waveform data 204 is processed by a harmonic identifier component 208 and a harmonic modulator component 210 before being combined in a summation component 212 with the received output voltage phase data after being processed by a sinusoidal shaper 206. The inverter voltage reference 214 is output by the combiner and may be received by an inverter in the UPS.

The controller 200 receives output waveform data 204 that is used by the controller 200 to generate the harmonic compensation signal. The output voltage waveform data 204 is received by the harmonic identifier component 208. The harmonic identifier component 208 identifies the harmonics that are present in the output voltage waveform data 204. Any frequency identification method may be employed to identify the harmonics including, for example, performing a Fourier transform operation on the output voltage waveform data. The identified harmonics are output by the harmonic identifier component 208 to a harmonic modulator component 210. The harmonic modulator component 210 creates a harmonic compensation signal based on the identified harmonics to combine with a sinusoidal reference signal generated by the sinusoidal shaper 206.

The controller 200 also receives output voltage phase data 202 from a phase lock loop (PLL) of the UPS that tracks the output waveform. The output voltage phase data 202 is used by the sinusoidal shaper component 206 to create the sinusoidal reference signal for the output inverter voltage reference 214. The sinusoidal reference signal output by the sinusoidal shaper 206 is combined with a harmonic compensation signal in the summation component 212 to create the output inverter voltage reference 214.

In some embodiments, the components described above with regard to FIG. 2 are software components that are executable by the controller 200. In other embodiments, some or all of the components may be implemented in hardware or a combination of hardware and software. Controller 200 may take a variety of forms dependent upon the specific application and processes used to perform the harmonic suppression. Other example harmonic suppression processes are described below with reference to FIGS. 3-5 that may be executed by controller 200 or any computer system communicatively connected to the UPS such as the computer system described below with reference to FIG. 6.

Example Harmonic Suppression Processes

Figure 3:
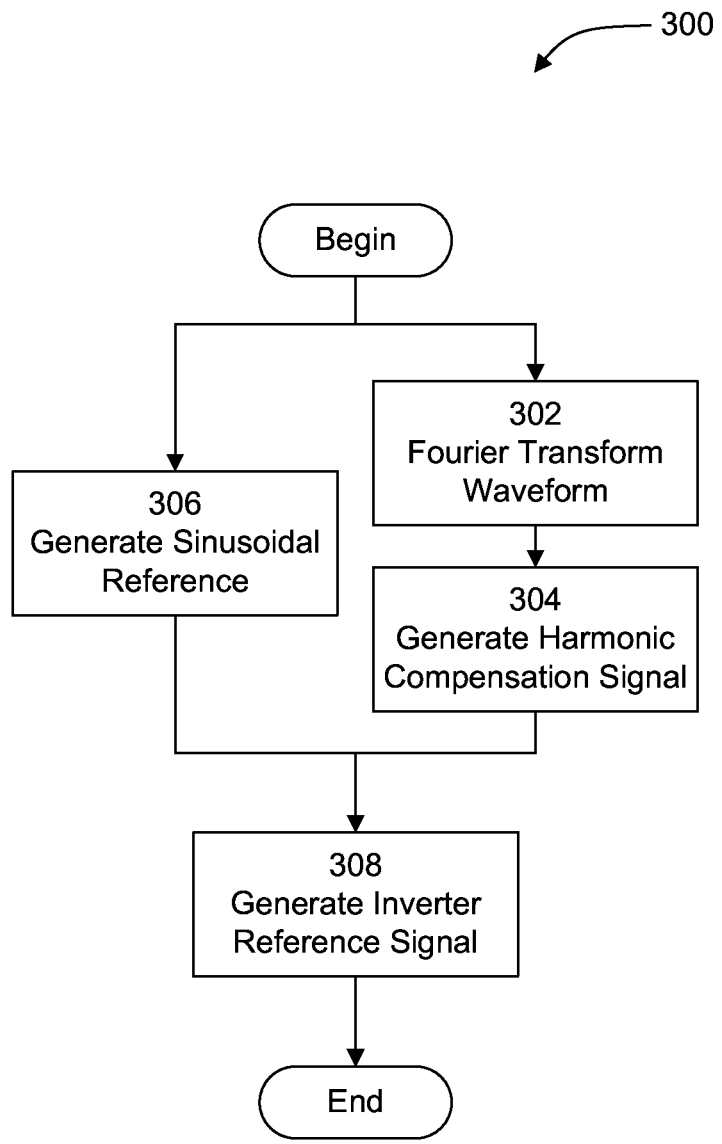
FIG. 3 is a flow diagram of one example method of harmonic suppression.

As described above with reference to FIGS. 1 and 2, several embodiments perform processes which reduce the THD of, for example, the output voltage waveform of a UPS. In some embodiments, these harmonic suppression processes are executed by a microprocessor-based computer system, such as the controller 118 in the UPS 100 described above with reference to FIG. 1 or the computer system 600 described below with reference to FIG. 6. FIG. 3 illustrates one example harmonic suppression process 300 performed by a UPS 100 (e.g., executed by controller 118 of UPS 100). The harmonic suppression process 300 may be to performed while the UPS 100 is delivering power to a load. The harmonic suppression process 300 identifies the harmonics present in the output voltage waveform and modulates an inverter reference signal by combining a harmonic compensation signal with a sinusoidal reference signal. The harmonic process 300 may be repeated any number of times and/or performed continuously to track and correct harmonic distortion. The harmonic suppression process 300 begins in act 302.

In act 302, the UPS 100 performs a Fourier transform on the output voltage waveform. Any Fourier transformation process such as, but not limited to, a fast Fourier transform (FFT) process may be employed by the UPS 100. The Fourier transform of the output waveform brings the output voltage waveform into the frequency domain where the signal is represented in the frequency spectrum as magnitude and phase values.

In act 304, the UPS 100 generates a harmonic compensation signal based on the magnitude and phase information of the output voltage waveform generated in act 302. For example, the UPS 100 may generate a set of sinusoidal signals with the respective magnitudes and phases as the harmonics identified in the output voltage waveform. The set of sinusoidal signals is then summed to generate the harmonic compensation signal.

In act 306, the UPS 100 generates a sinusoidal reference signal for the inverter reference signal. The sinusoidal reference signal corresponds to the ideal shape of the inverter output voltage. In act 308, the UPS 100 generates the inverter reference signal by combining the inverter reference signal with the harmonic compensation signal. The harmonic compensation signal generated in act 304 is inverted (e.g., multiplied by −1 or shifted 180 degrees in phase) and added with the sinusoidal reference signal generated in act 306 or, alternatively, subtracted from the sinusoidal reference signal generated in act 306.

Figure 4:
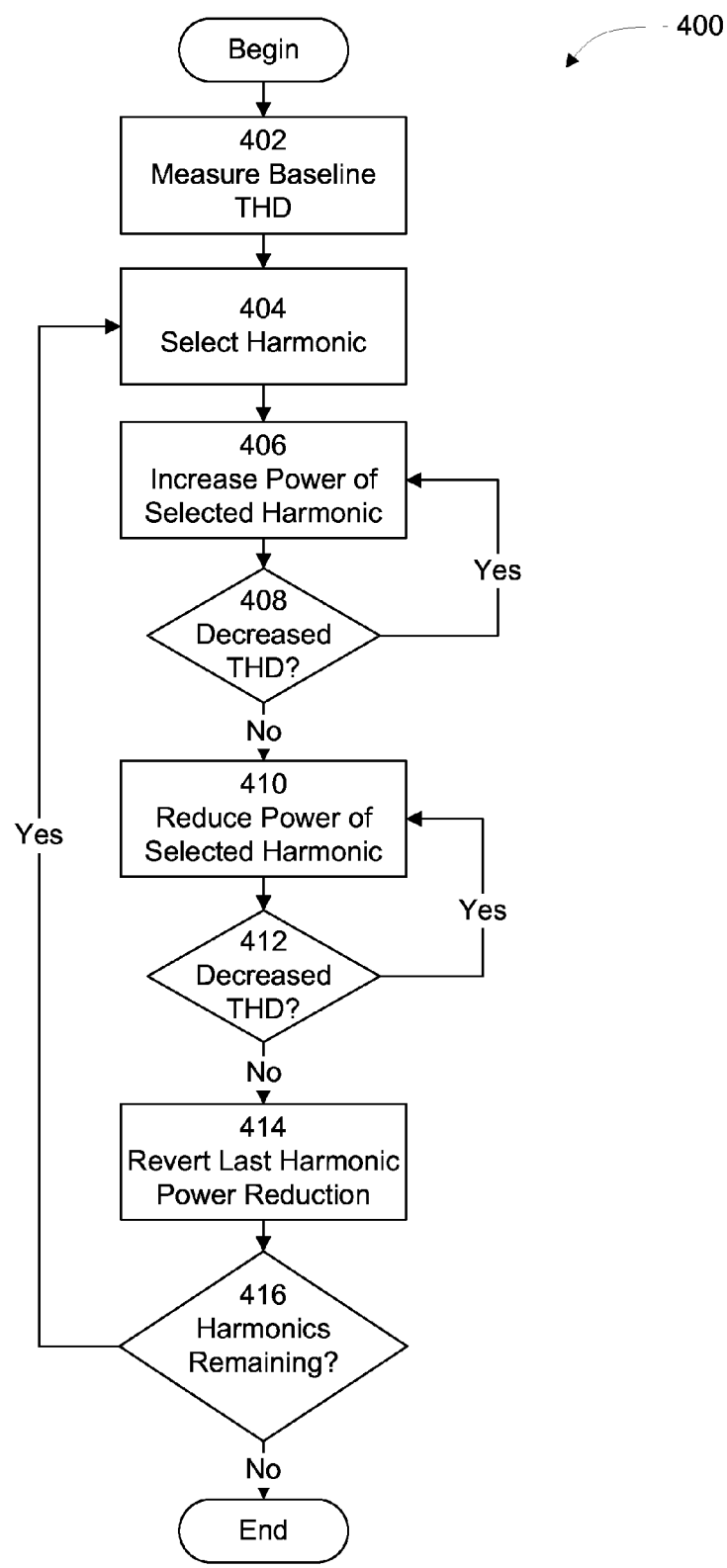
FIG. 4 is a flow diagram of another example method of harmonic suppression.

FIG. 4 illustrates another embodiment of a process for harmonic suppression performed by a UPS 100. The harmonic suppression process 400 finds local minima for each harmonic by incrementally increasing or decreasing the harmonic compensation for a particular harmonic and measuring the THD. The harmonic process 400 may be repeated any number of times and/or performed continuously to track and correct harmonic distortion. The harmonic suppression process 400 begins in act 402.

In act 402, the UPS 100 measures the baseline THD of the output voltage waveform that is employed in later acts as the benchmark THD. In act 404, the UPS 100 selects a harmonic to minimize. For example, the UPS 100 may have a pre-programmed list of to harmonics to analyze including, for example, a third harmonic, a fifth harmonic, and a seventh harmonic and select a harmonic from the pre-programmed list in act 404.

In act 406, the UPS 100 increases the power of the selected harmonic. The power of the selected harmonic is increased by subtracting a sinusoidal signal with the same frequency as the selected harmonic from the inverter voltage reference signal. In act 408, the UPS 100 measures the THD and determines whether the THD decreased relative to the last THD measurement. If the THD decreased, the UPS repeats act 406 and increases the power of the selected harmonic. Otherwise, the UPS 100 performs act 410 and reduces the power of the selected harmonic. The power of the selected harmonic is reduced by adding a sinusoidal signal with the same frequency as the selected harmonic from the inverter voltage reference signal. In act 412, the UPS 100 measures the THD and determines whether the THD decreased relative to the last THD measurement. If the THD decreased, the UPS 100 repeats act 410 of reducing the power of the selected harmonic. Otherwise, the UPS 100 proceeds to act 414 and reverts the last harmonic power reduction. In acts 406, 410, and 414 where the power of the selected harmonic is varied, the UPS 100 may determine the appropriate phase of the sinusoidal signal to add or subtract from the inverter reference voltage signal based on knowledge of the connected load including, for example, whether the load is a phase-phase load or a phase-neutral load.

In act 416, the UPS 100 determines whether any harmonics are remaining to be minimized. For example, the UPS 100 may determine whether any harmonics have not been minimized from a pre-programmed list of harmonics. If any harmonics are remaining to be minimized, the UPS 100 goes back to act 404 of selecting a harmonic and selects a new harmonic to minimize. Otherwise, the UPS 100 completes the harmonic suppression process 400. In another example, the UPS 100 may determine that all of the harmonic have been minimized from the pre-programmed list of harmonics and restart the process by going back to act 404 and selecting the lowest harmonic from the pre-programmed list. Otherwise, the UPS 100 completes the harmonic suppression process 400.

Figure 5:
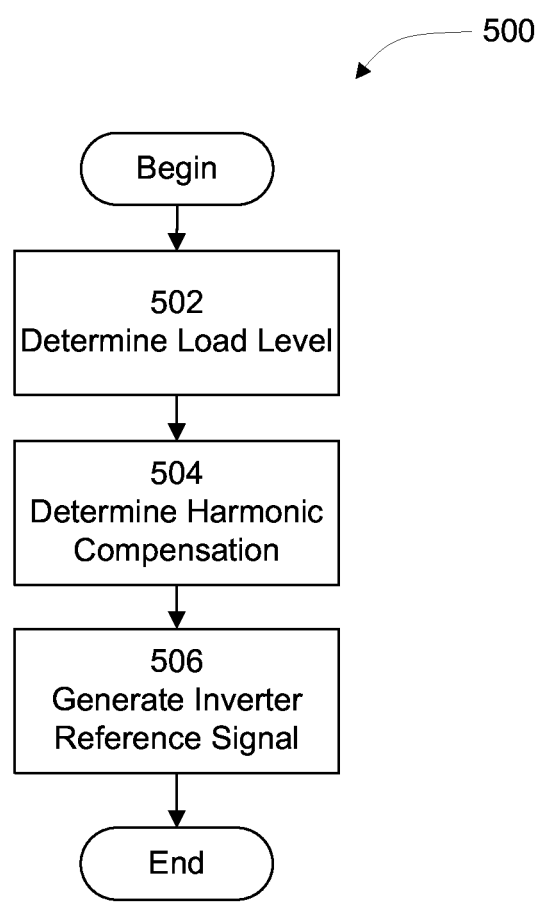
FIG. 5 is a flow diagram of another example method of harmonic suppression.

FIG. 5 illustrates another embodiment of a process for harmonic suppression performed by a UPS 100. The harmonic suppression process 500 utilizes a lookup table to select an amount of harmonic compensation based on the characteristics of the output current signal waveform. The harmonic process 500 may be repeated any number of times and/or performed continuously to track and correct harmonic distortion. The harmonic suppression process 500 begins in act 502.

In act 502, the UPS 100 determines the level of the load and/or the SMPS content of the load at the output of the UPS 100. The level of the load and/or the SMPS content is determined by analyzing the output inverter current waveform. For example, the inverter output current waveform may be compared with a sinusoidal reference to determine the amount of distortion relative to the sinusoidal reference. In multi-phase embodiments of UPS 100, the distribution between phase-phase load of the UPS 100 and phase-neutral load of the UPS 100 may also be determined based on the shape of the output inverter current waveform.

In act 504, the UPS 100 employs the load information (e.g., the level of the load and/or the SMPS content of the load) to determine the appropriate amount of harmonic compensation via a look-up table. The look-up table correlates the level of the load, and optionally the distribution of phase-phase and phase-neutral load, with various amounts of harmonic compensation. The look-up table values may be generated through laboratory testing. In act 506, the UPS 100 generates the inverter voltage reference based on the harmonic compensation information in act 504. For example, the UPS 100 may receive a set of harmonics with corresponding magnitude and phase information from the look-up table. Sinusoidal signals with the same magnitude and phase information as the set of harmonics received from the look-up table may be generated and combined to produce a harmonic compensation signal. The harmonic compensation signal is then combined with a sinusoidal reference to generate the inverter reference signal.

Embodiments of the AC/DC inverter 106 have been described for use in an online UPS 100 as shown in FIG. 1. In other embodiments, the THD improvement techniques may be provided in other types of UPSs including, for example, off-line, line-interactive, or any other type of UPS. The THD improvement techniques may also be used in other types of power devices including, for example, any power device that supplies AC power to a load.

Furthermore, various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Example Computer System

Figure 6:
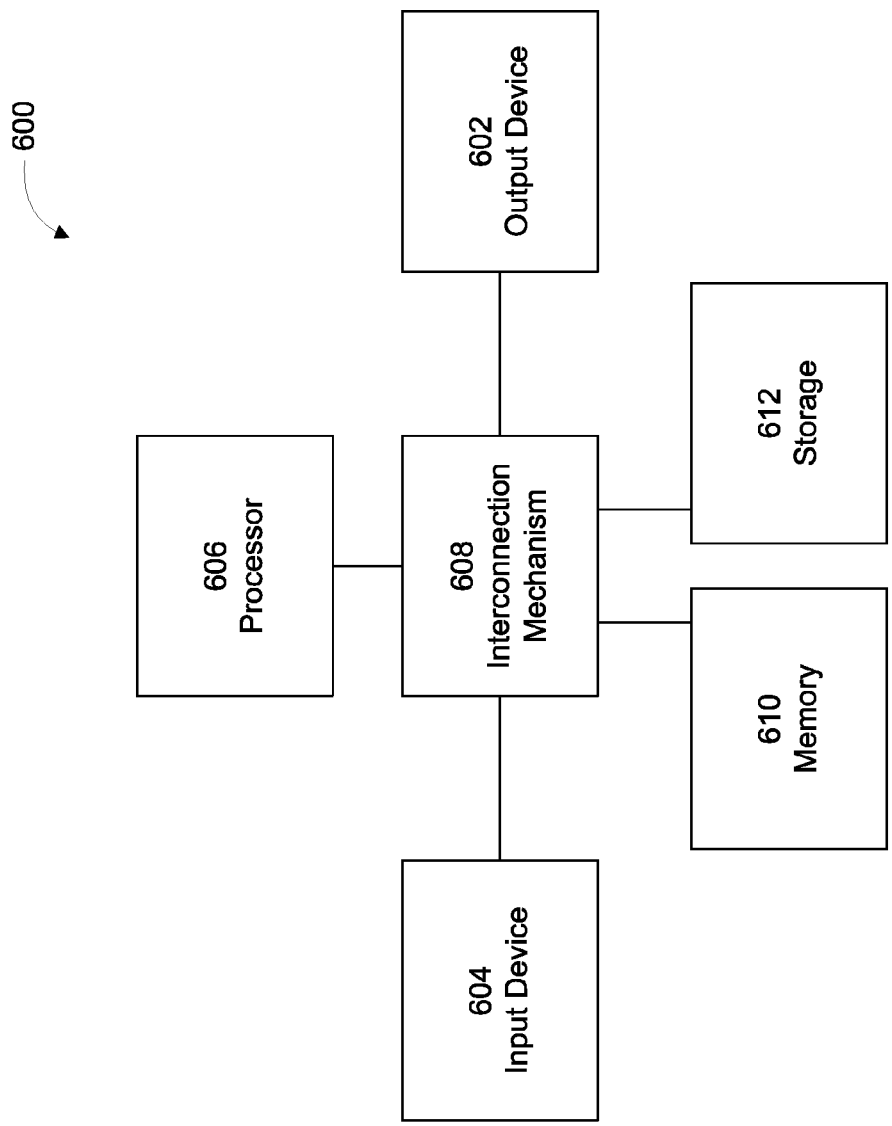
FIG. 6 is a block diagram of one example of a computer system upon which various aspects of the present embodiments may be implemented.

FIG. 6 illustrates an example a block diagram of computing components forming a system 600 which may be configured to implement one or more aspects disclosed herein. For example, the system 600 may be communicatively coupled to a UPS or included within a UPS and configured to perform a harmonic suppression process as described above with reference to FIGS. 3-5.

The system 600 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 600 may include specially-programmed, special-purpose hardware, for example, an application-specific integrated circuit (ASIC). Various aspects of the present disclosure may be implemented as specialized software executing on the system 600 such as that shown in FIG. 6.

The system 600 may include a processor/ASIC 606 connected to one or more memory devices 610, such as a disk drive, memory, flash memory or other device for storing data. Memory 610 may be used for storing programs and data during operation of the system 600. Components of the computer system 600 may be coupled by an interconnection mechanism 608, which may include one or more buses (e.g., between components that are integrated within a same machine) and/or a network (e.g., between components that reside on separate machines). The interconnection mechanism 608 enables communications (e.g., data, instructions) to be exchanged between components of the system 600. Further, in some embodiments the interconnection mechanism 608 may be disconnected during servicing of a PDU.

The system 600 also includes one or more input devices 604, which may include for example, a keyboard or a touch screen. An input device may be used for example to configure the measurement system or to provide input parameters. The system 600 includes one or more output devices 602, which may include for example a display. In addition, the computer system 600 may contain one or more interfaces (not shown) that may connect the computer system 600 to a communication network, in addition or as an alternative to the interconnection mechanism 608.

The system 600 may include a storage system 612, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 610 that allows for faster access to the information by the processor/ASIC than does the medium. This memory 610 may be a volatile, random access memory such as a dynamic random access memory (DRAM) or static memory (SRAM). It may be located in storage system 612 or in memory system 610. The processor 606 may manipulate the data within the integrated circuit memory 610 and then copy the data to the storage 612 after processing is completed. A variety of mechanisms are known for managing data movement between storage 612 and the integrated circuit memory element 610, and the disclosure is not limited thereto. The disclosure is not limited to a particular memory system 610 or a storage system 612.

The system 600 may include a general-purpose computer platform that is programmable using a high-level computer programming language. The system 600 may be also implemented using specially programmed, special purpose hardware, e.g. an ASIC. The system 600 may include a processor 606, which may be a commercially available processor such as the well-known Pentium class processor available from the Intel Corporation. Many other processors are available. The processor 606 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An uninterruptable power supply (UPS) comprising:
a first input constructed to receive input power from a first power source;
a second input constructed to receive input power from a second power source;
an output constructed to provide output alternating current (AC) power derived from at least one of the first power source and the second power source;
an inverter coupled to the first input, the second input, and the output and constructed to generate the output AC power; and
a controller coupled to the inverter and configured to:
to identify one or more harmonics in the output AC power;
generate an inverter reference signal; and
modulate the inverter reference signal to reduce harmonic distortion contributed by the one or more harmonics.

2. The UPS of claim 1, wherein the controller is configured to identify at least one of a third harmonic, a fifth harmonic, a seventh harmonic, a ninth harmonic, and an eleventh harmonic.

3. The UPS of claim 1, wherein the controller is further configured to identify the one or more harmonics in the output AC power at least in part by performing a Fourier transform on the output AC power.

4. The UPS of claim 1, wherein the controller is further configured to generate the inverter reference signal by generating a sinusoidal reference signal.

5. The UPS of claim 4, wherein the controller is further configured to modulate the inverter reference signal at least in part by combining the sinusoidal reference signal with a harmonic compensation signal generated based on the identified one or more harmonics.

6. The UPS of claim 1, wherein the controller is further configured to measure total harmonic distortion (THD) of a voltage associated with the output AC power.

7. The UPS of claim 6, wherein the controller is further configured to select a harmonic of the one or more harmonics.

8. The UPS of claim 7, wherein the controller is further configured to modulate the reference signal at least in part by finding local THD minima with respect to the selected harmonic.

9. The UPS of claim 8, wherein the controller is further configured to find the local THD minima with respect to the selected harmonic at least in part by reducing power of the selected to harmonic in the output AC power and measuring the THD of the voltage waveform of the output AC power.

10. The UPS of claim 8, wherein the controller is further configured to find the local THD minima with respect to the selected harmonic at least in part by increasing power of the selected harmonic in the output AC power and measuring the THD of the voltage waveform of the output AC power.

11. The UPS of claim 1, wherein the controller is further configured to identify the one or more harmonics at least in part by comparing an output current waveform of the AC output power to a sinusoidal reference signal and performing a look-up in a table of UPS loads and corresponding harmonic contributions.

12. The UPS of claim 11, wherein the controller is further configured to modulate the inverter reference signal at least in part by generating a harmonic compensation signal based on identified harmonics in the table of UPS loads and corresponding harmonic contributions.

13. A method for suppressing at least one harmonic of one or more harmonics in an output waveform of an uninterruptable power supply (UPS), the method comprising:
receiving input power from a power source;
generating output alternating current (AC) power derived from the input power based on an inverter reference signal;
identifying one or more harmonics in the output AC power;
generating the inverter reference signal; and
modulating the inverter reference signal to reduce harmonic distortion contributed by the one or more harmonics.

14. The method of claim 13, wherein identifying the one or more harmonics includes identifying at least one of a third harmonic, a fifth harmonic, a seventh harmonic, a ninth harmonic, and an eleventh harmonic.

15. The method of claim 13, wherein generating the inverter reference signal includes generating a sinusoidal reference signal and wherein modulating the inverter reference signal to includes combining the sinusoidal reference signal with a harmonic compensation signal generated based on the identified one or more harmonics.

16. The method of claim 13, wherein modulating the inverter reference signal includes finding local THD minima with respect to a selected harmonic of the one or more harmonics.

17. A non-transitory computer readable medium storing sequences of instructions executable by at least one processor, the sequences of instructions instructing the at least one processor to execute a process for harmonic suppression in an uninterruptable power source (UPS), the UPS including an inverter, the sequences of instructions including instructions configured to:
receive input power from a power source;
generate output alternating current (AC) power derived from the input power based on an inverter reference signal;
identify one or more harmonics in the output AC power;
generate the inverter reference signal; and
modulate the inverter reference signal to reduce the harmonic distortion contributed by the one or more harmonics.

18. The non-transitory computer readable medium of claim 17, wherein the instructions to identify the one or more harmonics include instructions to identify at least one of a third harmonic, a fifth harmonic, a seventh harmonic, a ninth harmonic, and an eleventh harmonic.

19. The non-transitory computer readable medium of claim 18, wherein the instructions to generate the inverter reference signal include instructions to generate a sinusoidal reference signal and wherein the instructions to modulate the inverter reference signal include instructions to combine the sinusoidal reference signal with a harmonic compensation signal generated based on the identified one or more harmonics.

20. The non-transitory computer readable medium of claim 19, wherein the instructions to modulate the inverter reference signal include instructions to find local THD minima with respect to a selected harmonic of the one or more harmonics.

* * * * *